(12) United States Patent
Asai

(10) Patent No.: US 10,180,548 B2
(45) Date of Patent: Jan. 15, 2019

(54) OPTICAL TRANSMISSION SUBSTRATE AND OPTICAL TRANSMISSION MODULE

(71) Applicant: KYOCERA Corporation, Kyoto-shi, Kyoto (JP)

(72) Inventor: Satoshi Asai, Kirishima (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 15/568,714

(22) PCT Filed: Apr. 21, 2016

(86) PCT No.: PCT/JP2016/062640
§ 371 (c)(1),
(2) Date: Oct. 23, 2017

(87) PCT Pub. No.: WO2016/175124
PCT Pub. Date: Nov. 3, 2016

(65) Prior Publication Data
US 2018/0088291 A1 Mar. 29, 2018

(30) Foreign Application Priority Data

Apr. 27, 2015 (JP) .................................. 2015-090395
Jun. 22, 2015 (JP) .................................. 2015-124543

(51) Int. Cl.
*G02B 6/42* (2006.01)
*G02B 6/122* (2006.01)

(52) U.S. Cl.
CPC .......... *G02B 6/4257* (2013.01); *G02B 6/423* (2013.01); *G02B 6/4214* (2013.01);
(Continued)

(58) Field of Classification Search
CPC .......... G02B 6/036; G02B 6/12; G02B 6/122; G02B 6/138; G02B 6/4214; G02B 6/423;
(Continued)

(56) References Cited

U.S. PATENT DOCUMENTS 7,876,988 B2   1/2011   Yasuda et al.
8,150,225 B2   4/2012   Yasuda et al.
(Continued)

FOREIGN PATENT DOCUMENTS

JP   2006-178282 A   7/2006
JP   2006178282   *   7/2006   ............... G02B 6/42
(Continued)

OTHER PUBLICATIONS

International Search Report, PCT/JP2016/062640, dated Jul. 19, 2016, 2 pgs.

*Primary Examiner* — Michael Mooney
(74) *Attorney, Agent, or Firm* — Volpe and Koenig, P.C.

(57) ABSTRACT

An optical transmission substrate of the disclosure includes a wiring substrate and an optical transmission line. The wiring substrate includes one main surface which includes a mounting area for a photoelectric conversion element. The optical transmission line includes a first cladding portion which is disposed on the one main surface of the wiring substrate and has a layer shape, at least one core portion which is disposed on the first cladding portion and has a strip shape, and a second cladding portion which is disposed on a part of the at least one core portion. The optical transmission line includes an end portion which is positioned in the mounting area. The end portion includes a part of the at least one core portion.

10 Claims, 3 Drawing Sheets

(52) U.S. Cl.
CPC ......... *G02B 6/4245* (2013.01); *G02B 6/4283*
(2013.01); *G02B 6/428* (2013.01); *G02B*
*6/4232* (2013.01); *G02B 6/4239* (2013.01);
*G02B 6/4249* (2013.01)

(58) Field of Classification Search
CPC .... G02B 6/4232; G02B 6/4257; G02B 6/428;
G02B 6/4283; G02B 6/43; H05K 1/0274
USPC ............................. 385/14, 88–94, 129–132
See application file for complete search history.

(56) References Cited

U.S. PATENT DOCUMENTS

| | | | |
|---|---|---|---|
| 9,671,575 B2 * | 6/2017 | Yamamoto | G02B 6/4214 |
| 2008/0285928 A1 | 11/2008 | Yasuda et al. | |
| 2010/0150508 A1 | 6/2010 | Yasuda et al. | |
| 2010/0247030 A1 | 9/2010 | Furuyama | |
| 2011/0274388 A1 | 11/2011 | Yamamoto | |

FOREIGN PATENT DOCUMENTS

| | | | | |
|---|---|---|---|---|
| JP | 2007-072307 A | | 3/2007 | |
| JP | 2008-281624 A | | 11/2008 | |
| JP | 2008281624 | * | 11/2008 | ............... G02B 6/12 |
| JP | 2010-232319 A | | 10/2010 | |
| JP | 2010232319 | * | 10/2010 | ............... G02B 6/12 |
| JP | 2010-277060 A | | 12/2010 | |
| JP | 2010277060 | * | 12/2010 | ............ G02B 6/122 |
| JP | 2011-107436 A | | 6/2011 | |
| JP | 2011107436 | * | 6/2011 | ............... G02B 6/42 |
| JP | 2011-237503 A | | 11/2011 | |
| JP | 2013-186310 A | | 9/2013 | |
| JP | 2016-206377 A | | 12/2016 | |

* cited by examiner

OPTICAL TRANSMISSION SUBSTRATE AND OPTICAL TRANSMISSION MODULE

TECHNICAL FIELD

The present invention relates to an optical transmission substrate and an optical transmission module including the optical transmission substrate.

BACKGROUND ART

In the related art, for example, as disclosed in Japanese Unexamined Patent Publication JP-A 2011-237503, there is known an opto-electric composite substrate in which a light emitting element and a light receiving element are mounted on a second cladding layer for coating a core layer of an optical waveguide.

SUMMARY OF INVENTION

An optical transmission substrate of the disclosure includes a wiring substrate and an optical transmission line. The wiring substrate includes one main surface which includes a mounting area for a photoelectric conversion element. The optical transmission line includes a first cladding portion which is disposed on the one main surface of the wiring substrate and has a layer shape, at least one core portion which is disposed on the first cladding portion and has a strip shape, and a second cladding portion which is disposed on a part of the at least one core portion. The optical transmission line includes an end portion which is positioned in the mounting area. The end portion includes a part of the at least one core portion.

An optical transmission module of the disclosure includes the optical transmission substrate mentioned above and a photoelectric conversion element. The photoelectric conversion element is disposed on the mounting area of the one main surface of the optical transmission substrate. A distance between an upper surface of the optical transmission substrate and a lower surface of the photoelectric conversion element is equal to or greater than a height of the end portion of the optical transmission line in the optical transmission substrate.

DESCRIPTION OF EMBODIMENTS

Hereinafter, an optical transmission module according to the disclosure will be described with reference to FIGS. 1 to 3. Although any direction of the optical transmission module may be used as an upper direction or a lower direction, in this specification, for convenient description, it is assumed that an orthogonal coordinates system (X, Y, Z) is defined and a term such as an upper surface or a lower surface is used by setting a positive side of a Z-axis direction as an upper direction.

The invention is not limited to an embodiment of the disclosure, and various changes, modifications, and the like are possible without departing from the scope of the invention.

Figure 1:
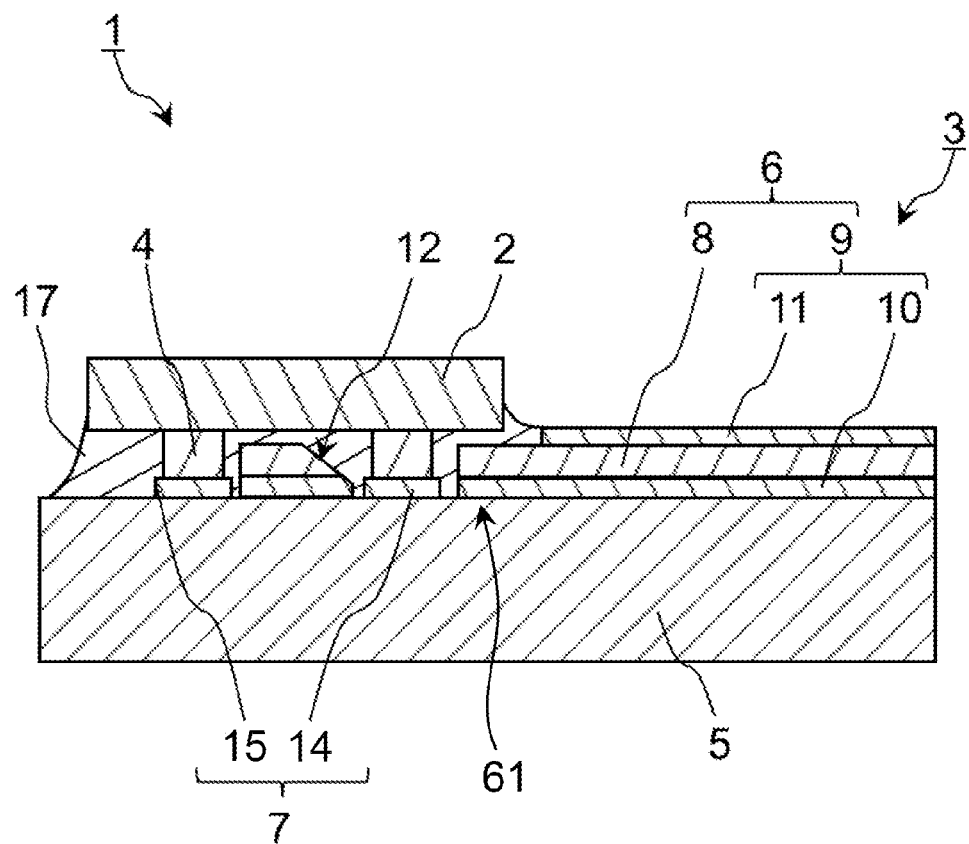
FIG. 1 is a sectional view schematically illustrating an optical transmission module according to an embodiment of the invention.
Figure 2:
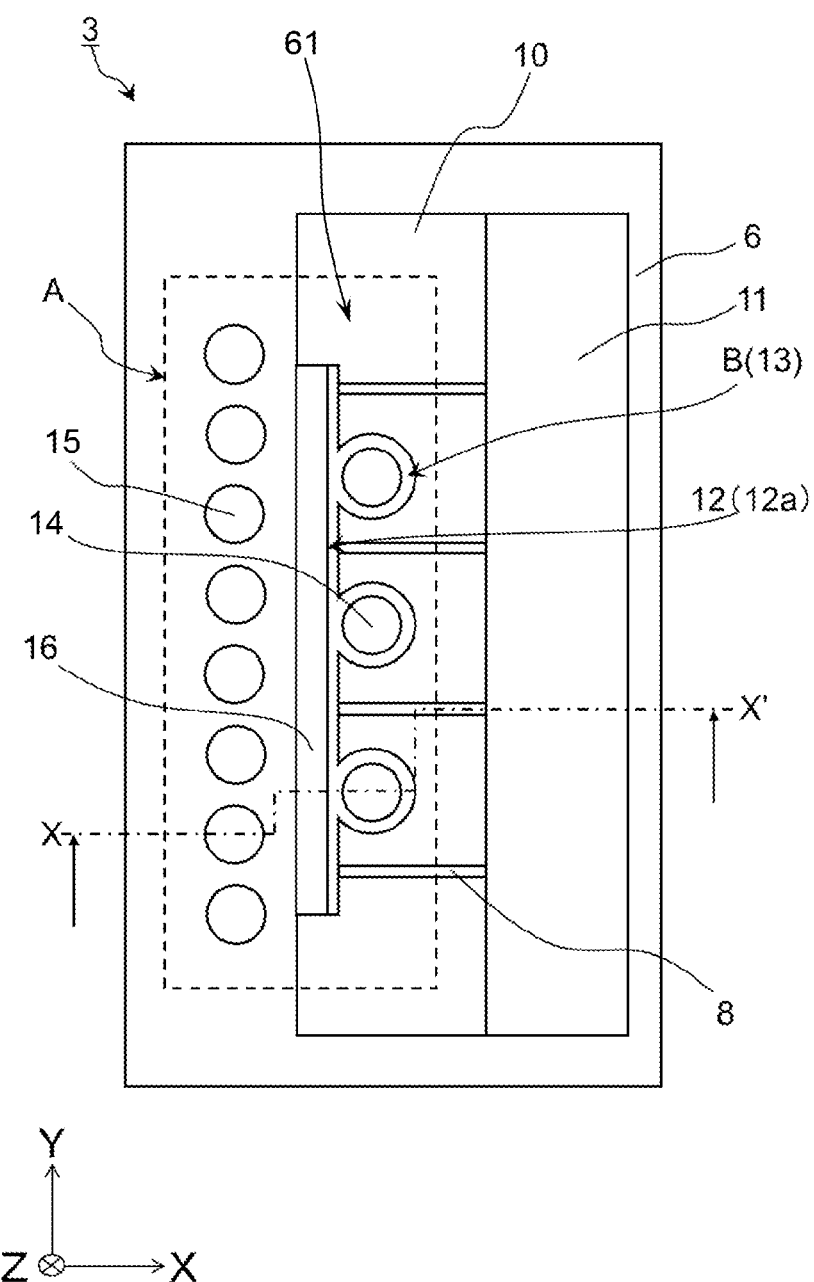
FIG. 2 is a top view schematically illustrating a part of an optical transmission module according to an embodiment of the invention.

FIGS. 1 and 2 illustrate the optical transmission module according to the embodiment of the invention. FIG. 1 is a sectional view illustrating the optical transmission module according to the embodiment when being taken along the line X-X' illustrated in FIG. 2, in a vertical direction (Z-axis direction). FIG. 2 is a top view schematically illustrating a state where a photoelectric conversion element is removed from the optical transmission module according to the embodiment.

For example, an optical transmission module 1 can convert an electric signal from an electric device into an optical signal and communicate with an external device by using the optical signal. The optical transmission module 1 is mounted, for example, in products such as an optical transceiver, a server, and a router. The optical transmission module 1 includes a photoelectric conversion element 2 and an optical transmission substrate 3 on which the photoelectric conversion element 2 is disposed.

The photoelectric conversion element 2 can convert an electric signal into an optical signal or convert an optical signal to an electric signal. As described above, the photoelectric conversion element 2 is disposed on the optical transmission substrate 3. Specifically, the photoelectric conversion element 2 is mounted on the optical transmission substrate 3 via a bump 4. The photoelectric conversion element 2 is mounted on an upper surface of the optical transmission substrate 3 by the bump 4 in a manner of flip chip. A distance between a lower surface of the photoelectric conversion element 2 and the upper surface of the optical transmission substrate 3 may be 25 μm or more and 150 μm or less, for example.

Various light emitting elements, various light receiving elements, or the like may be used as the photoelectric conversion element 2. For example, a vertical-cavity surface-emitting laser (VCSEL) and the like may be used as the light emitting element. For example, a photodiode and the like may be used as the light receiving element.

The bump 4 can conduct the photoelectric conversion element 2 and the optical transmission substrate 3. The bump 4 can fix the photoelectric conversion element 2 onto the optical transmission substrate 3. The bump 4 may be formed, for example, of a metal material such as gold, silver, copper, or solder. The bump 4 has a spherical shape or a columnar shape. In a case where the bump 4 has a spherical shape, for example, a solder ball and the like are used as the bump 4. In a case where the bump 4 has a columnar shape, for example, a stud bump and the like, which is formed of gold are used as the bump 4. The thickness of the bump 4 may be, for example, 20 μm or more and 100 μm or less.

The optical transmission substrate 3 includes a wiring substrate 5 and an optical transmission line 6 disposed on the wiring substrate 5. The photoelectric conversion element 2 is mounted on the upper surface of the wiring substrate 5. A part of the optical transmission line 6 is disposed between the wiring substrate 5 and the photoelectric conversion element 2. The photoelectric conversion element 2 and the wiring substrate are electrically connected. The photoelectric conversion element 2 and the optical transmission line 6 are optically connected. The photoelectric conversion element 2 has a light-receiving surface or a light-emitting surface at a position facing the optical transmission line 6, in order to transmit an optical signal along the optical transmission line 6.

The wiring substrate 5 can support the photoelectric conversion element 2 and the optical transmission line 6. The wiring substrate 5 may be formed in a manner that a plurality of insulating layers and a plurality of metal layers are alternately laminated, and metal layers which are adjacent to each other in the vertical direction are conducted to each other via a via conductor which is provided to penetrate one insulating layer. The metal layer can function as a wiring of the wiring substrate 5. The wiring substrate 5 can be produced by a well-known method in the related art.

The wiring substrate 5 is not limited to a case of including the plurality of insulating layers and the plurality of metal layers. The wiring substrate 5 may, for example, include one insulating layer and metal layers which are disposed on an upper surface and a lower surface of the one insulating layer. The wiring substrate 5 may, for example, include a stacked body configured by a plurality of insulating layers and metal layers which are disposed on an upper surface and a lower surface of the stacked body. The wiring substrate 5 may be obtained, for example, by combining one insulating layer, a stacked body configured by a plurality of insulating layers, and a plurality of metal layers.

The wiring substrate 5 has an upper surface (one main surface). The upper surface of the wiring substrate 5 has a mounting area A for the photoelectric conversion element 2. That is, the photoelectric conversion element 2 is mounted on the mounting area A. The wiring substrate 5 has a plurality of connection pads 7 which are disposed in the mounting area A of the upper surface of the wiring substrate 5, in order to be electrically connected to the photoelectric conversion element 2.

The mounting area A is an area right under the photoelectric conversion element 2, in the upper surface of the wiring substrate 5. In other words, when seen in a top view of the optical transmission module 1, the mounting area A corresponds to an area overlapping the photoelectric conversion element 2 in the wiring substrate 5.

The thickness of the connection pad 7 may be 5 μm or more and 50 μm or less, for example. The sum of the thickness of the connection pad 7 and the thickness of the bump 4 may be 25 μm or more and 150 μm or less, for example. The "distance between the lower surface of the photoelectric conversion element 2 and the upper surface of the optical transmission substrate 3" is defined as the sum of the thickness of the connection pad 7 and the thickness of the bump 4.

The insulating layer of the wiring substrate 5 may be formed of a resin material such as epoxy resin or a ceramics material such as silica ($SiO_2$), alumina ($Al_2O_3$), and zirconia ($ZrO_2$). The metal layer, the via conductor, and the connection pad 7 of the wiring substrate 5 may be formed, for example, of a metal material such as copper and aluminum.

The optical transmission line 6 can transmit an optical signal. The optical transmission line 6 includes at least one core portion 8 through which light passes, and a cladding portion 9 configured to surround the core portion 8. In other words, the core portion 8 is disposed on the inner side of the cladding portion 9. At least one core portion 8 of the optical transmission line 6 of the disclosure includes a plurality of core portions 8.

A refractive index of the core portion 8 is greater than a refractive index of the cladding portion 9. With such a configuration, light which is incident to the core portion 8 can propagate in the core portion 8 while being reflected on an interface between the core portion 8 and the cladding portion 9. As a result, the optical transmission line 6 can transmit light.

The core portion 8 may be formed, for example, of epoxy resin and the like. The cladding portion 9 may be formed, for example, of epoxy resin, polyimide resin, phenolic resin, acrylic resin, or the like. The refractive index of the core portion 8 may be, for example, 1.5 or more and 1.6 or less. The refractive index of the cladding portion 9 may be, for example, 1.45 or more and 1.55 or less. The refractive index of the core portion 8 may be greater than the refractive index of the cladding portion 9 by a value corresponding to a range of 0.1% or more and 0.5% or less of the refractive index of the cladding portion 9, for example.

The cladding portion 9 of the optical transmission line 6 includes a first cladding portion 10 and a second cladding portion 11. Specifically, the first cladding portion 10 is formed to have a layer shape and is laminated on the upper surface of the wiring substrate 5. The core portion 8 is formed to have a strip shape and is disposed on an upper surface of the first cladding portion 10. The second cladding portion 11 is disposed so as to cover the upper surface and a side surface of the core portion 8.

The optical transmission line 6 may be formed in a manner that a resin film for the first cladding portion 10, the core portion 8, or the second cladding portion 11 is prepared on the upper surface of the wiring substrate 5 and heating, exposing, and developing are properly performed.

The thickness of the first cladding portion 10 of the optical transmission line 6 may be, for example, 5 μm or more and 50 μm or less. The thickness of the core portion 8 may be, for example, 20 μm or more and 50 μm or less. The thickness of the second cladding portion 11 may be, for example, 5 μm or more and 50 μm or less.

The optical transmission line 6 includes an end portion 61 positioned in the mounting area A of the wiring substrate 5, in order to achieve optical connection with the photoelectric conversion element 2. In other words, a part of the optical transmission line 6 which overlaps the mounting area A (or photoelectric conversion element 2) of the wiring substrate 5, functions as the end portion 61. The end portion 61 of the optical transmission line 6 includes a part of at least one core portion 8. Specifically, the part of at least one core portion 8 of the optical transmission line 6 is positioned in the mounting area A. That is, a height of the end portion of the optical transmission line 6 is set to be smaller than a height of the connection pad 7 and the bump 4. The end portion 61 (plurality of core portions 8) of the optical transmission line 6 is positioned between the upper surface of the wiring substrate 5 and the lower surface of the photoelectric conversion element 2. As a result, it is possible to reduce the distance between the photoelectric conversion element 2 and the core portion 8 in comparison to that in the related art. It is possible to reduce a loss of an optical signal which occurs between the photoelectric conversion element 2 and the core portion 8. Thus, it is possible to reduce a loss of an optical signal in the optical transmission module 1 in addition to a loss of an optical signal in the optical transmission substrate 3.

The height of the end portion 61 of the optical transmission line 6 may be, for example, 25 μm or more and 150 μm or less. The end portion 61 of the optical transmission line 6 corresponds to a part of the optical transmission line 6 which is positioned in the mounting area A of the wiring substrate 5 in this specification. That is, when seen in a transparent top view of the optical transmission module 1, a part of the optical transmission line 6 which overlaps the photoelectric conversion element 2, corresponds to the end portion 61 of the optical transmission line 6.

The end portion 61 of the optical transmission line 6 further includes an inclined surface 12 for guiding an optical signal from the photoelectric conversion element 2 into the core portion 8. The optical transmission line 6 includes the inclined surface 12 so as to achieve optical connection with the photoelectric conversion element 2. That is, the optical transmission line 6 can reflect, for example, light which is emitted downward from the photoelectric conversion element 2, on the inclined surface 12 in a planar direction (XY planar direction) and can guide the light into the core portion 8. The optical transmission line 6 can reflect upwardly light transmitted in the core portion 8 and guide the light into the photoelectric conversion element 2.

In the optical transmission line 6 of the disclosure, the end portion 61 of the optical transmission line 6 further includes a groove 12a which has an opening in the upper surface of the core portion 8 and extends along a width direction of the core portion 8. The inclined surface 12 is an inner surface of the groove 12a. The groove 12a is formed for each of the plurality of core portions 8. The inclined surface 12 (groove 12a) can be formed in a manner that a part of the optical transmission line 6 is cut off by using laser processing or the like.

The thickness of the part of the second cladding portion 11 which is positioned in the mounting area A, may be thinner than the thickness of a part of the second cladding portion 11 which is positioned outside the mounting area A. That is, the second cladding portion 11 at the end portion 61 of the optical transmission line 6 is thinner than the second cladding portion at other portions thereof. As a result, it is possible to reduce the distance between the upper surface of the wiring substrate 5 and the lower surface of the photoelectric conversion element 2. Accordingly, it is possible to further reduce a distance between the core portion 8 of the optical transmission line 6 and the photoelectric conversion element 2, and to reduce a loss of an optical signal in the optical transmission module 1.

The end portion 61 of the optical transmission line 6 may not have the second cladding portion 11. In other words, the core portion 8 may be not covered by the second cladding portion 11.

As illustrated in FIG. 2, the end portion 61 of the optical transmission line 6 may include at least one penetration area B which penetrates the optical transmission line 6 in the vertical direction. Specifically, the end portion 61 of the optical transmission line 6 may have a penetration area B which has openings on the upper surface and lower surfaces of the first cladding portion 10. A plurality of connection pads 7 may include a connection pad 7 positioned in the penetration area B. As a result, it is possible to fix the photoelectric conversion element 2 in a region in which the end portion 61 of the optical transmission line 6 overlaps the photoelectric conversion element 2 in the vertical direction. Accordingly, it is possible to stabilize optical connection between the photoelectric conversion element 2 and the optical transmission line 6.

The penetration area B is positioned in a region between the plurality of core portions 8. The penetration area B penetrates the first cladding portion 10, and thus includes openings on the upper surface and lower surface of the first cladding portion 10.

As illustrated in FIG. 2, the penetration area B of the disclosure is in a state of overlapping only some connection pad among the plurality of connection pads 7 in the wiring substrate 5. However, the penetration area B may overlap all of the plurality of connection pads 7. As in the disclosure, in a case where the penetration area B overlaps some connection pads 7, it is possible to reduce a formation region of the penetration area B when the penetration area B is formed and thus the connection pad 7 is exposed from the optical transmission line 6. In addition, it is possible to reduce an occurrence of a trouble that the connection pad 7 is not exposed. Thus, it is possible to improve connection reliability between the photoelectric conversion element 2 and the optical transmission substrate 3.

The state where the penetration area B overlaps the connection pad 7 indicates a state where the connection pad 7 is positioned in the penetration area B. That is, at this time, the connection pad 7 is exposed from the optical transmission line 6 (first cladding portion 10) via the penetration area B.

As illustrated in FIG. 2, the connection pads 7 may be positioned with the core portion 8 interposed between the connection pads 7, along a direction orthogonal to a longitudinal direction of the core portion 8. In a case where the optical transmission line 6 includes a plurality of core portions 8, some connection pads 7 on the wiring substrate 5 may be disposed so as to be interposed between the plurality of core portions 8.

The plurality of connection pads 7 may include a plurality of first connection pads 14 and a plurality of second connection pads 15. The plurality of first connection pads 14 are simply used for fixing the photoelectric conversion element 2 to the wiring substrate 5. The plurality of second connection pads 15 are used for transmitting an electric signal to the photoelectric conversion element 2 from the wiring substrate 5. In other words, the plurality of first connection pads 14 are not conducted to the photoelectric conversion element 2 and are non-electrically connected to the photoelectric conversion element 2. The plurality of second connection pads 15 are electrically connected to the photoelectric conversion element 2.

Some of the plurality of connection pads 7 which overlap the penetration area B of the end portion 61 of the optical transmission line 6 may belong to the plurality of first connection pads 14. As a result, the optical transmission line 6 does not surround the second connection pads 15. Thus, it is possible to reduce an occurrence of a situation in which the end portion of the optical transmission line 6 is heated by the second connection pads 15 which are easily heated by a current flowing. Accordingly, it is possible to reduce an occurrence of thermal expansion of the optical transmission line 6, and it is possible to reduce an occurrence of separation and the like of the optical transmission line 6.

The plurality of first connection pads 14 of the disclosure are arranged in a line in the direction (Y-axis direction) orthogonal to the longitudinal direction (X-axis direction) of the core portion 8. The plurality of second connection pads 15 is arranged in a line along the plurality of first connection pads 14. In other words, the plurality of first connection pads 14 and the plurality of second connection pads 15 are in a state of being arranged in two lines.

The wiring substrate 5 may include a via conductor positioned right under the first connection pad 14, and the first connection pad 14 and the via conductor may be connected to each other. As a result, it is possible to reduce an occurrence of separation of the first connection pad 14 in comparison to a case where the first connection pad 14 is simply disposed on the wiring substrate 5.

At least one penetration area B may include a plurality of penetration areas (through-holes) 13. With such a configuration, there is such an advantageous effect that a plurality of pads of the light emitting element or the light receiving element can be connected to the wiring substrate 5 and inclination of the element in connection is prevented.

For example, the penetration area B may perform penetration from the upper surface of the optical transmission line 6 over the lower surface thereof, and the penetration area B may be formed by a recess portion and the like which is recessed from an end surface of the optical transmission line 6 in the longitudinal direction of the core portion 8.

A width of the through-hole 13 may be greater than a width of the connection pad 7. As a result, when the optical transmission substrate 3 is manufactured, the connection pad 7 is exposed more easily than a case where a formation position of the through-hole 13 is shifted. Thus, it is possible to stably improve electrical reliability of the photoelectric conversion element 2 and the optical transmission substrate 3.

The width of the through-hole 13 may be smaller than the width of the connection pad 7. As a result, the first cladding portion 10 can overlap the connection pad 7, and thus it is possible to reduce an occurrence of separation and the like of the connection pad 7.

The first cladding portion 10 may protrude from the mounting area A in a direction orthogonal to the longitudinal direction of the core portion 8. As a result, it is possible to increase a contact area between the optical transmission line 6 and the wiring substrate 5, and it is possible to prevent the occurrence of separation of the optical transmission line 6.

When one core portion 8 among the plurality of core portions 8 is viewed, a width of a part constituting the end portion 61 of the optical transmission line 6 may be greater than a width of a part which does not constitute the end portion 61 of the optical transmission line 6. In other words, in one core portion 8, the part positioned in the mounting area A may have a greater width than that of the part which is positioned outside the mounting area A. As a result, it is possible to increase a contact area between the core portion 8 and the first cladding portion 10, and it is possible to reduce an occurrence of separation and the like of the core portion 8. If a width of the core portion 8 disposed at a place other than the end portion 61 of the optical transmission line 6 is reduced, it is possible to reduce spreading of light emitted from the optical transmission line 6, and it is possible to reduce a loss of light in the photoelectric conversion element 2.

The end portion 61 of the optical transmission line 6 may include a bundling portion 16 which is connected to ends of the plurality of core portions 8 together and comprises a material similar to that of the core portion 8. As a result, it is possible to increase a contact area between the core portion 8 and the first cladding portion 10, and it is possible to reduce an occurrence of separation and the like of the core portion 8.

In the end portion 61 of the optical transmission line 6, the inclined surface 12 may be formed at the bundling portion 16. As a result, the area of the inclined surface 12 is increased. Thus, it is possible to reduce a loss of emitted light, for example, even though light emitted from the optical transmission line 6 is incident to the photoelectric conversion element 2 as the light receiving element and the emitted light from the optical transmission line 6 is spread.

Figure 3:
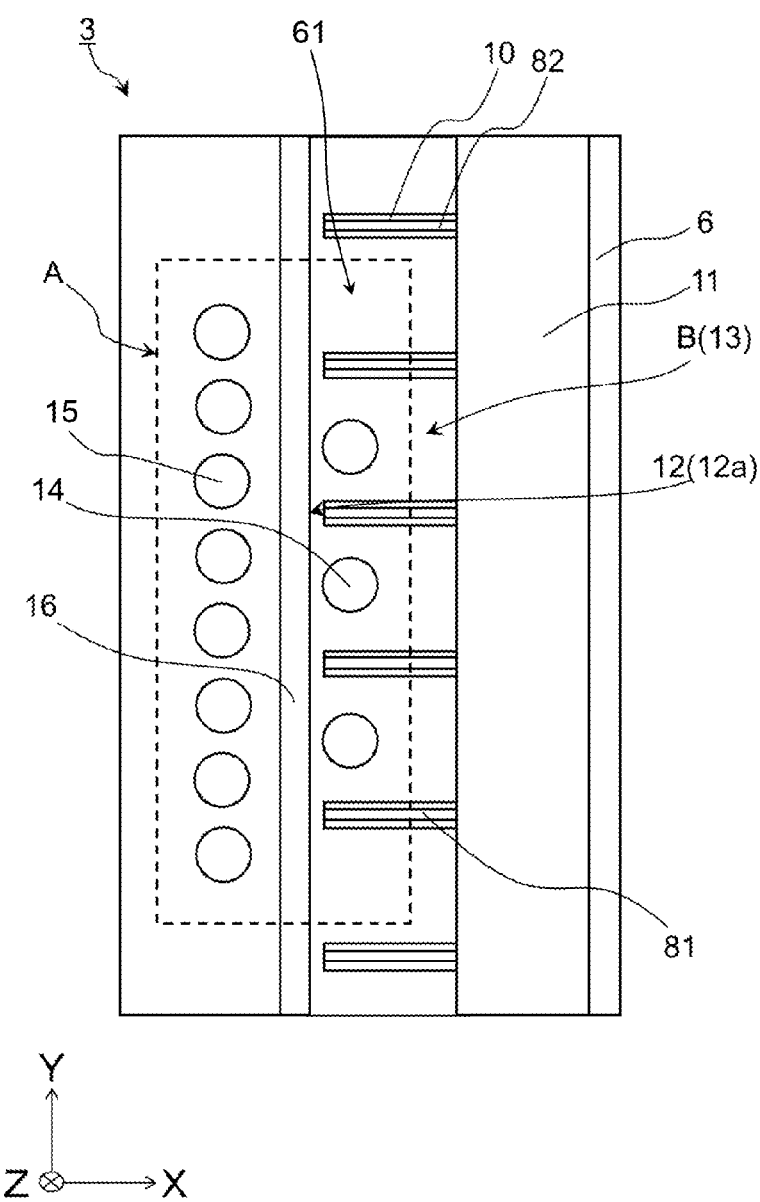
FIG. 3 is a top view schematically illustrating a part of an optical transmission module according to another embodiment of the invention, which is different from the embodiment illustrated in FIG. 2.

As illustrated in FIG. 3, some of the plurality of core portions 8 may include a first core portion 81 and a second core portion 82. The first core portion 81 has a part positioned in the mounting area A. The second core portion 82 is disposed to be adjacent to the first core portion 81 and is positioned outside the mounting area A. As a result, when the groove 12a is formed in the plurality of core portions 8 by dicing, cutting water including a cutting chip which is generated by the dicing flows on the groove 12a as a flow path, and the cutting chip adheres to the vicinity of the second core portion 82.

The first core portion 81 is used for transmitting an optical signal, and the second core portion 82 is a dummy core portion in which an optical signal is not transmitted. Therefore, it is possible to reduce adhering of the cutting chip to the inclined surface 12 which contributes to transmission of an optical signal, and to reduce a loss of light. The second core portion 82 may be not positioned outside the mounting area A. A plurality of second core portions 82 may be provided on one side of the first core portion 81.

The penetration area B and the groove 12a are in communication with each other. As a result, it is possible to reduce an occurrence of a situation in which, when the groove 12a is formed in the plurality of core portions 8 by dicing, the cutting water including a cutting chip which is formed by the dicing flows out to the penetration area B, and thus waste adheres to the inclined surface 12. Thus, it is possible to reduce a loss of light.

A transparent underfill 17 is disposed in an empty space between the photoelectric conversion element 2 and the wiring substrate 5. As a result, it is possible to improve connection strength of the photoelectric conversion element 2 to the wiring substrate 5. The underfill 17 may be formed, for example, of a resin material such as silicone resin or epoxy resin.

In the end portion 61 of the optical transmission line 6, in a case where the core portion 8 is not covered by the second cladding portion 11, the underfill 17 may be disposed so as to cover a part of the core portion 8 which is not covered by the second cladding portion 11. As a result, it is possible to protect the core portion 8.

A refractive index of the underfill 17 may be smaller than the refractive index of the core portion 8. As a result, in the end portion of the optical transmission line 6, the underfill 17 performs a function as the cladding portion 9. Thus, it is possible to favorably transmit an optical signal even in the end portion of the optical transmission line 6. The refractive index of the underfill 17 may be, for example, 1.45 or more and 1.55 or less.

REFERENCE SIGNS LIST

1: Optical transmission module
2: Photoelectric conversion element
3: Optical transmission substrate
4: Bump
5: Wiring substrate
6: Optical transmission line
61: End portion
7: Connection pad
8: Plurality of core portions
81: First core portion
82: Second core portion
9: Cladding portion
10: First cladding portion
11: Second cladding portion
12: Inclined surface
12a: Groove
13: Through-hole
14: First connection pad
15: Second connection pad
16: Bundling portion
17: Underfill
A: Mounting area
B: Penetration area

The invention claimed is:

1. An optical transmission substrate, comprising:
a wiring substrate which includes one main surface including a mounting area for a photoelectric conversion element and includes at least one connection pad which is disposed in the mounting area of the one main surface and is capable of connection with the photoelectric conversion element;
an optical transmission line which includes a first cladding portion which is disposed on the one main surface of the wiring substrate and has a layer shape, at least one core portion which is disposed on the first cladding portion and has a strip shape, and a second cladding portion which is disposed on a part of the at least one core portion wherein a thickness of a part of the second cladding portion is positioned in the mounting area and is smaller than a thickness of a part of the second cladding portion which is positioned outside the mounting area,
the optical transmission line further including an end portion positioned in the mounting area, the end portion including a part of the at least one core portion, wherein the end portion includes at least one penetration area including openings on an upper surface and a lower surface of the first cladding portion, and the at least one connection pad is positioned in the at least one penetration area; and
at least one second connection pad which does not overlap the optical transmission line, wherein the at least one connection pad is defined as a first connection pad.

2. The optical transmission substrate according to claim 1, wherein the at least one penetration area includes a plurality of penetration areas.

3. The optical transmission substrate according to claim 2, wherein a width of each of the plurality of penetration areas is greater than a width of the at least one connection pad.

4. The optical transmission substrate according to claim 1, wherein the end portion further includes a groove which has an opening in an upper surface of the at least one core portion and extends along a width direction of the at least one core portion, and an inner surface of the groove corresponds to an inclined surface which is capable of reflecting light.

5. The optical transmission substrate according to claim 1, wherein a width of the at least one core portion at the end portion is greater than a width of the at least one core portion at other portions.

6. The optical transmission substrate according to claim 1, wherein the first connection pad is non-electrically connected to the photoelectric conversion element, and
the second connection pad is electrically connected to the photoelectric conversion element.

7. The optical transmission substrate according to claim 1, wherein the at least one core portion includes a plurality of core portions, and the end portion further includes a bundling portion comprising a material similar to that of the at least one core portion, and
the bundling portion is connected to ends of the plurality of core portions.

8. The optical transmission substrate according to claim 1, further comprising:
at least one second core portion which is disposed to be adjacent to a first core portion and is positioned outside the mounting area, wherein the at least one core portion is defined as the first core portion.

9. The optical transmission substrate according to claim 4, wherein the at least one penetration area is disposed between a plurality of core portions, and
the groove is in communication with the at least one penetration area.

10. An optical transmission module, comprising:
the optical transmission substrate according to claim 1; and
a photoelectric conversion element which is disposed on the mounting area of the one main surface of the optical transmission substrate,
a distance between an upper surface of the optical transmission substrate and a lower surface of the photoelectric conversion element being equal to or greater than a height of the end portion of the optical transmission line in the optical transmission substrate.

* * * * *